US008743711B2

(12) United States Patent
Trainin

(10) Patent No.: US 8,743,711 B2
(45) Date of Patent: Jun. 3, 2014

(54) TECHNIQUES FOR MANAGING HETEROGENEOUS TRAFFIC STREAMS

(75) Inventor: Solomon Trainin, Haifa (IL)

(73) Assignee: Intel Corporation, Santa Clara, CA (US)

(*) Notice: Subject to any disclaimer, the term of this patent is extended or adjusted under 35 U.S.C. 154(b) by 1087 days.

(21) Appl. No.: 12/638,056

(22) Filed: Dec. 15, 2009

(65) Prior Publication Data
US 2011/0141968 A1 Jun. 16, 2011

(51) Int. Cl.
G08C 15/00 (2006.01)
H04L 12/28 (2006.01)
H04L 12/56 (2011.01)

(52) U.S. Cl.
USPC .......................................... 370/252; 370/392

(58) Field of Classification Search
None
See application file for complete search history.

(56) References Cited

U.S. PATENT DOCUMENTS

| | | | |
|---|---|---|---|
| 6,490,451 B1 | 12/2002 | Denman et al. | |
| 7,170,877 B2 | 1/2007 | Livet et al. | |
| 8,005,055 B2 | 8/2011 | Kwak et al. | |
| 2002/0075831 A1* | 6/2002 | Lozano | 370/335 |
| 2005/0025180 A1 | 2/2005 | Igor et al. | |
| 2005/0195855 A1 | 9/2005 | Buskirk et al. | |
| 2005/0238016 A1* | 10/2005 | Nishibayashi et al. | 370/389 |
| 2006/0109832 A1* | 5/2006 | Ginzburg | 370/346 |
| 2006/0146868 A1* | 7/2006 | Ginzburg | 370/465 |
| 2007/0104162 A1* | 5/2007 | Kneckt et al. | 370/338 |
| 2008/0123660 A1 | 5/2008 | Mohammed et al. | |
| 2009/0233545 A1* | 9/2009 | Sutskover et al. | 455/25 |
| 2010/0260153 A1* | 10/2010 | Hollick et al. | 370/336 |
| 2010/0315999 A1* | 12/2010 | Kakani et al. | 370/328 |

FOREIGN PATENT DOCUMENTS

WO 2008090486 7/2008

OTHER PUBLICATIONS

U.S. Appl. No. 61/186,814, Kakani et al., Jun. 13, 2009, paragraph [0053].*
IEEE STD 802.11-2007 "IEEE Standard for Information technology—Telecommunications and information exchange between systems—Local and metropolitan area networs—Specific requirements, Part 11: Wireless LAN Medium Access Control (MAC) and Physical Layer (PHY) Specifications", New York, NY, Jun. 12, 2007.
Office Action received for Japanese Patent Application No. 2012-544503, mailed Sep. 18, 2013, 8 pages including 4 pages English translation.

* cited by examiner

Primary Examiner — Chirag Shah
Assistant Examiner — Ashley Shivers
(74) Attorney, Agent, or Firm — Kacvinsky Daisak Bluni PLLC

(57) ABSTRACT

Techniques for managing heterogeneous traffic streams are described. An apparatus may include wireless device having a transceiver and a media access control controller operative to communicate in a wireless network, the media access control controller having a traffic stream manager operative to establish a wireless communication channel between a first and second wireless device, and communicate multiple traffic streams in a single service period over the wireless communication channel, with each traffic stream having a different level of reliability for delivery of information from the first wireless device to the second wireless device. Other embodiments are described and claimed.

28 Claims, 10 Drawing Sheets

TECHNIQUES FOR MANAGING HETEROGENEOUS TRAFFIC STREAMS

BACKGROUND

Wireless communication systems communicate information over a shared wireless communication medium such as one or more portions of the radio-frequency (RF) spectrum. Recent innovations in Millimeter-Wave (mmWave) communications operating at the 60 Gigahertz (GHz) frequency band promises several Gigabits-per-second (Gbps) throughput within short ranges of approximately 10 meters. Current mmWave communications systems may communicate different types of information, such as video and multimedia streaming, with each type of information consuming different amounts of wireless resources. Applications with varying quality of service (QoS) requirements may utilize different acknowledgement schemes, modulation and coding schemes, protocols, bandwidth amounts, memory resources, and so forth. For example, a voice over Internet Protocol (VoIP) application communicating voice information for a telephone call may have higher QoS requirements than data information used by an electronic mail (email) or streaming video application. Furthermore, some applications demand higher bandwidth than other applications, sometimes on a dynamic basis. Consequently, techniques to increase efficient use of wireless resources may increase performance and usability of a wireless communication system. It is with respect to these and other considerations that various improvements are made.

DETAILED DESCRIPTION

Figure 1:
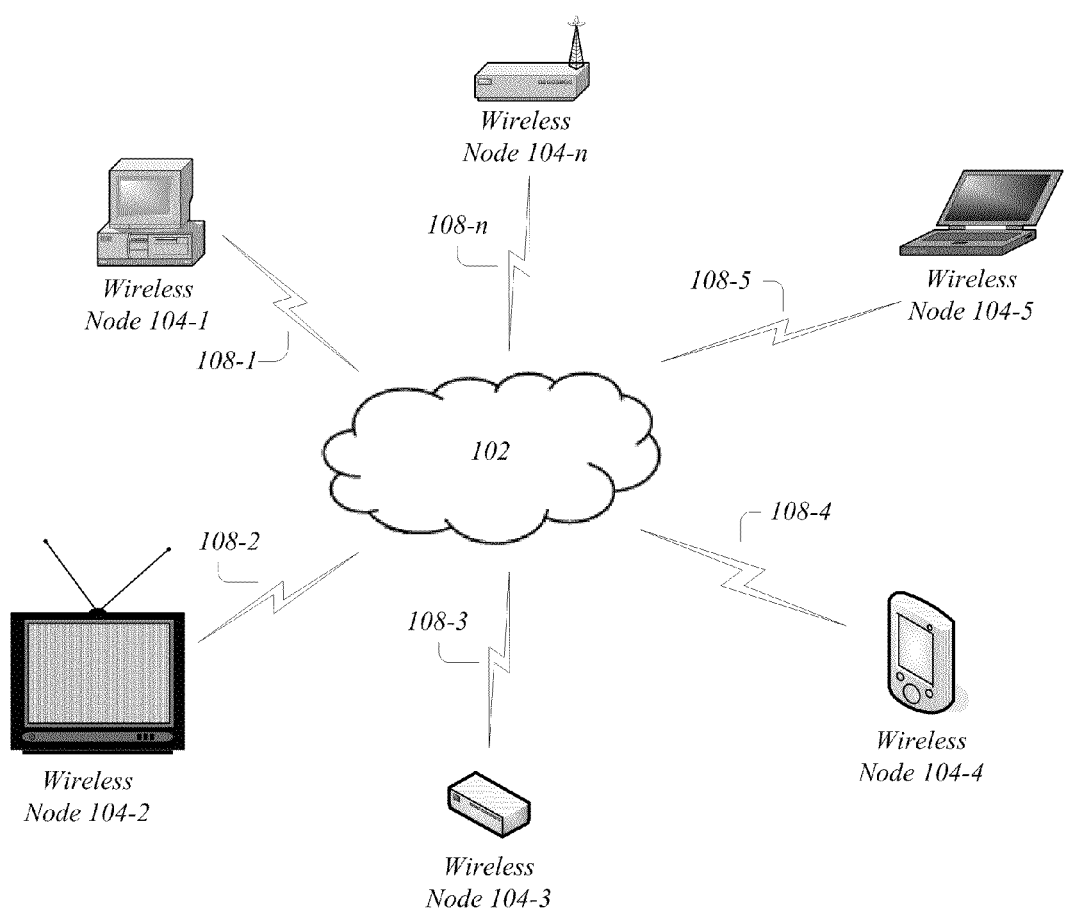
FIG. 1 illustrates one embodiment of a communications system.

Various embodiments may be generally directed to enhanced traffic management techniques for managing heterogeneous traffic streams for wireless communication systems. Some embodiments may be particularly directed to enhanced traffic management techniques for managing heterogeneous traffic streams communicated over one or more wireless communications channels of a high throughput (HT) wireless communications system, such as a 60 GHz mmWave wireless video area network (WVAN), a wireless personal area network (WPAN), or a wireless local area network (WLAN), for example. WVAN and WPAN networks are sometimes referred to as "piconets" due to their limited transmission ranges and participating devices.

Enhanced traffic management techniques may provide several advantages over conventional techniques. In many cases, a wireless link may be unreliable. For instance, traffic data may be lost depending on link conditions, such as fading, interference, moving people, moving mobile devices, and other factors. Higher data rates are even more sensitive to such link conditions. One known solution to achieve higher data rates and reliable transmission for data frames is through use of rate adaptation and retransmission of frames. The other known solution is using very low rates for reliable transmission of short control frames. These solutions fit well to the data transmission characteristics of a communications protocol such as the Transmission Control Protocol/Internet Protocol (TCP/IP), where the intent is to deliver each frame without any lost information. The current QoS generally does not change assumption of the lossless delivery. However, some applications may not need lossless delivery, so applying one level of reliability across all applications may result in inefficient use of wireless resources. For instance, some streaming video applications may stand to lose a few data frames without collapsing the entire application, although the quality may suffer. On the other hand, different portions of data from an application may need higher reliability than other portions. Such a separation exists for Unequal Protection where a most significant bit (MSB) may need more reliability then a least significant bit (LSB), and for compressed video like MPEG where the "I" frames are more important than other types of frames. Currently there are no efficient solutions for delivering different data frames with different levels of reliability. Higher reliability may be achieved, for example, by using a more robust modulation and control scheme (MCS) and increasing a retry number for specified data frames but not for all data frames. It therefore becomes important when link bandwidth is limited to allocate more wireless resources to more important data to be delivered with higher reliability at the expense of other less important data frames. In addition to efficient use of link bandwidth, another problem is that a maximum media access control (MAC) service data unit (SDU) (MSDU) size is typically defined by a given communications protocol, and therefore cannot be negotiated even when a given application may use shorter MSDU sizes. This leads to inefficient reservation of memory and results in higher device cost.

Embodiments attempt to solve these and other problems by allowing multiple traffic streams to be transmitted within a single time period, providing each traffic stream with a different level of selected reliability, and negotiating a maximum buffer size for receiving devices. In one embodiment, for example, enhanced traffic management techniques allow a wireless device to communicate one or more traffic streams within a single time period, such as a service period (SP). This has an advantage of allowing one or more applications to communicate different types of information within a single SP, thereby efficiently utilizing RF resources. In one embodiment, for example, enhanced traffic management techniques allow different traffic streams communicated within a single SP to be communicated at different reliability levels, thereby allowing wireless devices to allocate wireless resources to those traffic streams having higher priority or QoS requirements. In one embodiment, for example, the enhanced traffic management techniques allow one wireless device to communicate memory requirements for information transmitted to another wireless device, thereby increasing efficient use of memory resources for the receiving device. Other embodiments are described and claimed.

These and other enhanced traffic management services may be implemented using one or more standard wireless communications protocols modified with new information elements as described herein. Various embodiments define a novel information element (IE) or data structure referred to as a peer-to-peer traffic specification (PTP TSPEC) that may be used for peer-to-peer communications or ad-hoc networks between peer wireless devices, such as two or more wireless stations in a WVAN, WPAN or WLAN, for example. The PTP TSPEC information element may be used to enhance or replace conventional information elements in various WVAN, WPAN or WLAN standardized communications protocols. In one embodiment, for example, the PTP TSPEC information element may be used to enhance or replace conventional TSPEC information elements in various WVAN, WPAN or WLAN standardized communications protocols. The embodiments are not limited in this context.

FIG. 1 illustrates a block diagram of one embodiment of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communications system 100 may comprise, or form part of a wired communications system, a wireless communications system, or a combination of both. For example, the communications system 100 may include one or more nodes arranged to communicate information over one or more types of wired communication links. Examples of a wired communication link, may include, without limitation, a wire, cable, bus, printed circuit board (PCB), Ethernet connection, peer-to-peer (PTP) connection, backplane, switch fabric, semiconductor material, twisted-pair wire, co-axial cable, fiber optic connection, and so forth. The communications system 100 also may include one or more nodes arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The communications system 100 may communicate information in accordance with one or more standards as promulgated by a standards organization. In one embodiment, for example, various devices comprising part of the communications system 100 may be arranged to operate in accordance with any specification, standards or variants suitable for mmWave communications operating around the 60 Gigahertz (GHz) frequency band, including without limitation one or more of the Wireless Gigabit Alliance (WGA) specifications, such as the WGA Draft Candidate D0.5r0, July 2009 ("WGA Draft Standard"), its progeny, revisions and variants; one or more of the WirelessHD™ specifications, standards or variants, such as the WirelessHD Specification, Revision 1.0d7, Dec. 1, 2007, and its progeny as promulgated by WirelessHD, LLC (collectively referred to as the "WirelessHD Specification"), or with any other wireless standards as promulgated by other standards organizations such as the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and so forth. In various embodiments, for example, the communications system 100 may communicate information according to one or more IEEE 802.11 standards for wireless local area networks (WLANs), such as IEEE 802.11-2007 Revision of IEEE Standard 802.11-1999, Jun. 12, 2007 ("IEEE 802.1-2007 Standard"), its progeny, revisions and variants; IEEE 802.15.3 and variants; IEEE 802.16 standards for wireless metropolitan area networks (WMAN) including the IEEE 802.16 standard such as 802.16-2004, 802.16.2-2004, 802.16e-2005, 802.16f, and variants; European Computer Manufacturers Association (ECMA) TG20 progeny and variants; and other wireless networking standards. The embodiments are not limited in this context.

The communications system 100 may communicate, manage, or process information in accordance with one or more protocols. A protocol may comprise a set of predefined rules or instructions for managing communication among nodes. In various embodiments, for example, the communications system 100 may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. In various embodiments, the communications system 100 also may be arranged to operate in accordance with standards and/or protocols for media processing. The embodiments are not limited in this context.

As shown in FIG. 1, the communications system 100 may comprise a network 102 and a plurality of wireless nodes 104-1-n, where n may represent any positive integer value. In various embodiments, the wireless nodes 104-1-n may be implemented as various types of wireless devices. Examples of wireless devices may include, without limitation, an IEEE 802.15.3 piconet controller (PNC), a controller, an IEEE 802.11 Private Basic Service Set (PBSS) Control Point (PCP), a coordinator, a station, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smartphone, pager, messaging device, media player, media server, digital music player, set-top box (STB), appliance, workstation, user terminal, mobile unit, consumer electronics, television, digital television, high-definition television, television receiver, high-definition television receiver, and so forth. In the illustrated embodiment shown in FIG. 1, the wireless nodes 104-1-n may comprise a PC 104-1, a digital TV 104-2, a media source 104-3 (e.g., a CD, DVD, media file server, etc.), a handheld device 104-4, and a laptop or notebook 104-5. These are merely a few examples, and the embodiments are not limited in this context.

In some embodiments, the wireless nodes 104-1-n may comprise one more wireless interfaces and/or components for wireless communication such as one or more transmitters, receivers, transceivers, chipsets, amplifiers, filters, control logic, network interface cards (NICs), antennas, antenna arrays, modules and so forth. Examples of an antenna may include, without limitation, an internal antenna, an omnidirectional antenna, a monopole antenna, a dipole antenna, an end fed antenna, a circularly polarized antenna, a micro-strip antenna, a diversity antenna, a dual antenna, an antenna array, and so forth.

In various embodiments, the wireless nodes 104-1-$n$ may comprise or form part of a wireless network 102. In one embodiment, for example, the wireless network 102 may comprise a mmWave wireless network operating at the 60 GHz frequency band. More particularly, the wireless network 102 and the wireless nodes 104-1-$n$ may implement communications protocols, standards and specifications promulgated by the WGA Draft Standard and/or the IEEE 802.11-2007 set of standards, progeny or variants. Although some embodiments may be described with the wireless network 102 implemented as a mmWave wireless network for purposes of illustration, and not limitation, it can be appreciated that the embodiments are not limited in this context. For example, the wireless network 102 may comprise or be implemented as various types of wireless networks and associated protocols suitable for a WVAN, WPAN, WLAN, WMAN, Wireless Wide Area Network (WWAN), Broadband Wireless Access (BWA) network, a radio network, a cellular radiotelephone network, a cable network, a television network, a satellite network such as a direct broadcast satellite (DBS) network, and/or any other wireless communications network configured to operate in accordance with the described embodiments.

In various embodiments, a conventional mmWave wireless network operating at the 60 Gigahertz (GHz) frequency band may include one of wireless nodes 104-1-$n$ that acts as a central coordinator node. The coordinator node may be operative to control the timing in the piconet, keep track of the members of the piconet, and may be operative to transmit and receive data. The remaining wireless nodes 104-1-$n$ may comprise stations that are operative transmit and receive data. In one embodiment, for example, one of the wireless nodes 104-1-$n$ may act as a private basic service set (PBSS) control point (PCP) for two or more other wireless nodes 104-1-$n$ to establish a unidirectional or bidirectional wireless communications channel between the two or more wireless nodes 104-1-$n$. Other embodiments are described and claimed.

The network 102 allows for peer-to-peer or ad hoc network communications where the wireless nodes 104-1-$n$ may communicate directly with each other without necessarily needing a fixed device, such as a wireless access point. In one embodiment, for example, the network 102 provides for contention-based medium access, such as carrier sense multiple access (CSMA) technique, often combined with a collision avoidance (CA) technique for wireless networks (CSMA/CA). The CSMA/CA technique is intended to provide fair and equal access to the wireless nodes 104-1-$n$, where each wireless node 104-1-$n$ listens to the wireless shared medium before attempting to communicate. To accommodate bandwidth demanding and time-sensitive information, such as audio/video (AV) or multimedia streams, the network 102 may implement QoS techniques to implement controlled fairness. Traffic having a higher priority is given preferential access to the wireless shared medium. Contention-based medium access, however, is susceptible to severe performance degradation when overloaded. As such, admission control techniques are used to regulate the amount of data contending for the wireless shared medium.

Admission control is often negotiated by the use of a traffic specification (TSPEC). A wireless node 104-1-$n$ specifies its traffic flow requirements and requests a quality access point (QAP) or PCP to create a new traffic specification between two or more wireless nodes 104-1-$n$ by sending control signals to the QAP or PCP. The control signals may include, for example, MAC management action frames, such as an add traffic stream (ADDTS) action request frame and an ADDTS action response frame. The QAP or PCP to calculates an existing network load on a current set of issued traffic specifications. Based on the current conditions, the QAP or PCP may accept, deny or modify the new traffic specification request.

One problem associated with contention-based medium access is that it becomes difficult or impossible to communicate different types of data frames with varying levels of reliability and/or QoS requirements within a given communication time period, such as a single service period (SP) for a WPAN or WLAN. Typically a single traffic stream is assigned to a single service period. Even when multiple traffic streams are assigned to a single service period, all of the traffic streams must have a same level of reliability or QoS. In other words those traffic streams communicated within a single service period are not differentiated with respect to reliability or QoS. Therefore, reliability and/or QoS for multiple traffic streams must be set at a uniformly high level to accommodate lossless delivery, which is inefficient for those applications that can suffer packet loss, or vice-versa. Another problem associate with contention-based medium access is that a maximum media access control (MAC) service data unit (SDU) (MSDU) size is typically defined by a given communications protocol, and therefore cannot be negotiated even when a given application may use shorter MSDU sizes. This leads to inefficient reservation of memory and results in higher device cost.

Exacerbating these problems is that current WLAN communication protocols, such as the IEEE 802.11 and 802.15 communication protocols, do not provide any mechanism to deliver information for a traffic stream in relation to their reliability. For example, the primitive of the MAC service access point (SAP) does not contain reliability parameters, but only Traffic Stream Identification (TSID), acknowledgement type, data and Addressing, as shown below:

```
MA-UNITDATA.request (
    source address,
    destination address,
    data,
    TID/TSID,
    service class (QoSAck or QoSNoAck)
)
```

Furthermore, the 802.11 and 802.15 time reservation mechanisms do not allow a wireless device a way for aggregating several traffic streams in one service period, and another group of traffic streams in a different service period. Only a scheduler, typically implemented in an access point, may decide how to combine the allocated time. Although the 802.11 standard does allow aggregating traffic streams into one service period, there is no selective mechanism to accomplish this per traffic stream. In addition, the existent traffic stream specification (TSPEC) describes traffic characteristics and QoS requirements of a traffic stream. The main purpose of the TSPEC is to reserve resources within an access point or PCP, and modify the corresponding scheduling behavior. However, the TSPEC does not specify any parameters for MAC transmission.

Embodiments attempt to solve these and other problems by allowing multiple traffic streams to be transmitted within a single time period, providing each traffic stream with a different level of selected reliability, and negotiating a maximum buffer size for receiving devices. In one embodiment, for example, the wireless nodes 104-1-*n* may implement enhanced traffic management techniques that allow a wireless device to communicate one or more traffic streams within a single time period, such as a single SP. This has an advantage of allowing one or more applications to communicate different types of information within a single SP, thereby efficiently utilizing RF resources. In one embodiment, for example, the wireless nodes 104-1-*n* may implement enhanced traffic management techniques that allow different traffic streams communicated within a single SP to be communicated at different reliability levels, thereby allowing wireless devices to allocate wireless resources to those traffic streams having higher priority or QoS requirements. In one embodiment, for example, the wireless nodes 104-1-*n* may implement enhanced traffic management techniques that allow one wireless device (e.g., a wireless node 104-1) to communicate memory requirements for information transmitted to another wireless device (e.g., a wireless node 104-2), thereby increasing efficient use of memory resources for the receiving device (e.g., the wireless node 104-2). Other embodiments are described and claimed.

The wireless nodes 104-1-*n* may implement these and other enhanced traffic management services may be implemented using one or more standard wireless communications protocols modified with new information elements as described herein. Various embodiments define a novel information element (IE) or data structure referred to as a peer-to-peer traffic specification (PTP TSPEC) that may be used for peer-to-peer communications or ad-hoc networks between peer wireless devices, such as two or more wireless stations in a WVAN, WPAN or WLAN, for example. The PTP TSPEC information element may be used to enhance or replace conventional information elements in various WVAN, WPAN or WLAN standardized communications protocols. In one embodiment, for example, the PTP TSPEC information element may be used to enhance or replace conventional TSPEC information elements in various WVAN, WPAN or WLAN standardized communications protocols. The embodiments are not limited in this context.

Figure 2:
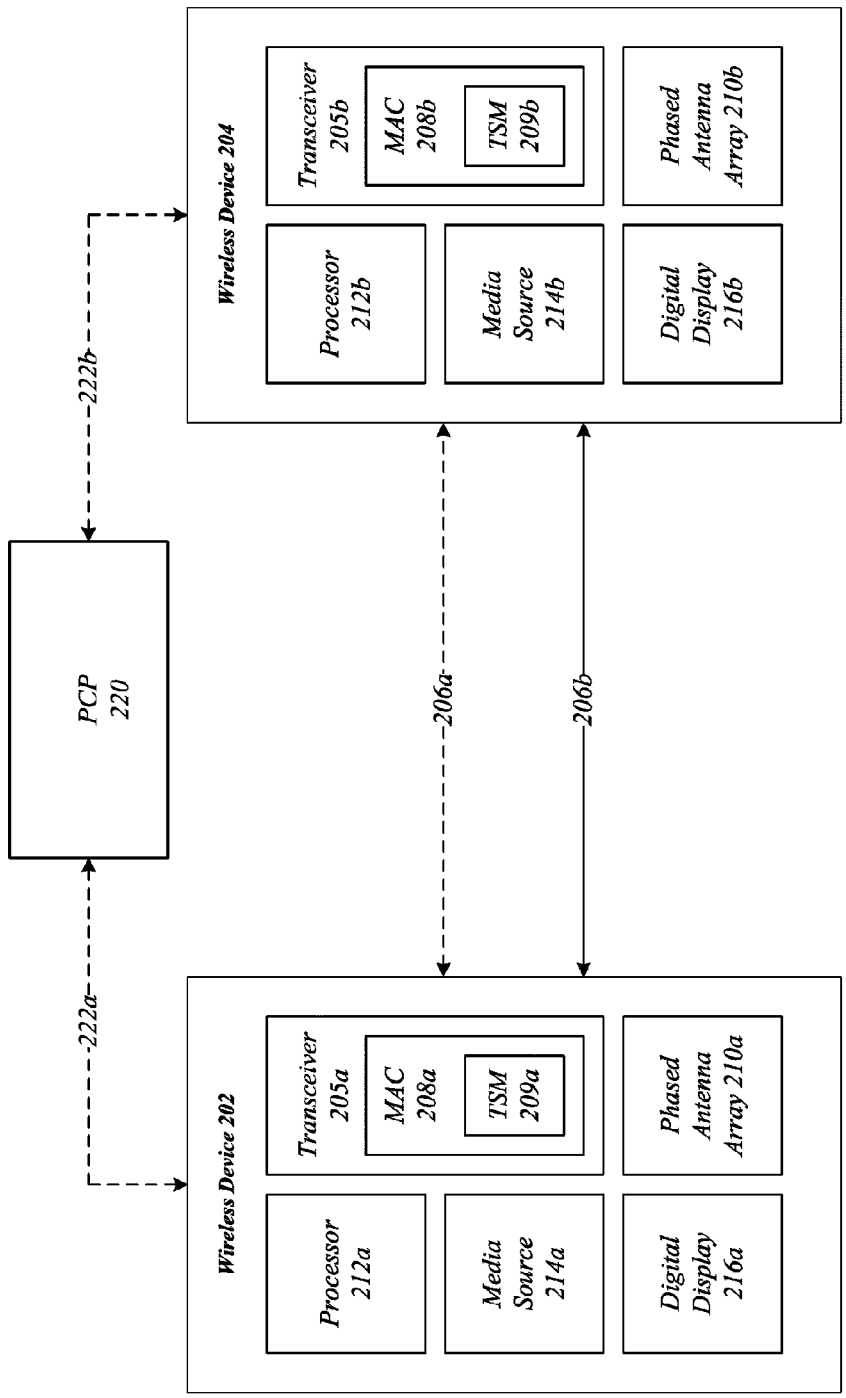
FIG. 2 illustrates one embodiment of a first wireless network.

FIG. 2 illustrates a block diagram of one embodiment of a wireless network 200. For ease of illustration, and not limitation, the wireless network 200 depicts a limited number of wireless devices by way of example. For instance, the wireless network 200 depicts the wireless devices 202, 204 and a PCP 220. It can be appreciated that more wireless devices may be employed for a given implementation.

As shown, the wireless network 200 may comprise a wireless device 202 coupled to a wireless device 204. In various embodiments, the wireless communications system 200 may comprise or be implemented by one or more elements of the communications system 100 of FIG. 1, such as wireless network 102 and the wireless nodes 104-1-*n*. The embodiments are not limited in this context.

In one embodiment, for example, the wireless devices 202, 204 may be implemented as WGA Draft Standard, WirelessHD Specification or IEEE 802.11-2007 Standard compliant devices, and the wireless network 200 may be implemented as a WVAN network. In such an embodiment, the wireless network 200 may communicate information in accordance with the WGA Draft Standard, WirelessHD Specification and/or IEEE 802.11-2007 Standard and associated techniques, and the wireless device 202 may comprise a WGA Draft Standard, WirelessHD Specification and/or IEEE 802.11-2007 Standard compliant device communicatively coupled to the wireless device 204 comprising another WGA Draft Standard, WirelessHD Specification and/or IEEE 802.11-2007 Standard compliant device. In various implementations, the wireless network 200 may support a unicast and/or multicast communication environment for distributing media content by unicasting and/or multicasting from the wireless device 202 to the wireless device 204.

In various embodiments, the wireless devices 202, 204 each may include the capability to establish one or more wireless communications channels 206 using respective transceivers 205*a*, 205*b* coupled to respective phased antenna arrays 210*a*, 210*b*. In the illustrated embodiment shown in FIG. 2, for example, the wireless devices 202, 204 may establish a control channel 206*a* to exchange control signals and a data channel 206*b* to exchange data signals. The embodiments are not limited in this context.

In various embodiments, the communications channel 206 may be implemented at the MAC layer of the communication protocol stack within a transceiver and/or wireless communication chipset of a wireless device. As such, the transceivers 205*a*, 205*b* may each include respective MAC controllers 208*a*, 208*b*. The MAC controllers 208*a*, 208*b* may be arranged to implement logic for various MAC layer operations to generate one or more of MAC frames, such as a MAC packet data unit (PDU) or service data unit (SDU). It may be appreciated that other computing and communications elements common to electronic devices may be implemented by the wireless devices 202, 204 implementing the MAC controllers 208*a*, 208*b*. For example, the wireless devices 202, 204 implementing the MAC controllers 208*a*, 208*b* may further include various computing resources or elements as appropriate for a given implementation, such as a processor, memory, chipsets, controllers, peripherals, input devices, output devices, and so forth. For instance, the wireless devices 202, 204 may each include one or more of respective processors 212*a*, 212*b*, media sources 214*a*, 214*b*, and digital displays 216*a*, 216*b*. In another example, the wireless devices 202, 204 implementing the MAC controllers 208*a*, 208*b* may further include various communications resources or elements as appropriate for a given implementation, such as baseband processors, filters, amplifiers, modulators, demodulators, multiplexers, mixers, switches and so forth. The embodiments are not limited in this context.

Each of the transceivers 205*a*, 205*b* may implement respective traffic stream managers 209*a*, 209*b*. In one embodiment, the traffic stream managers 209*a*, 209*b* may be implemented as part of a MAC layer or sub-layer, and as such are shown as part of the MAC controllers 208*a*, 208*b*. It may be appreciated that the traffic stream managers 209*a*, 209*b* may be implemented elsewhere in the wireless devices 202, 204 as desired for a given implementation, such as the host processors 212*a*, 212*b*, for example.

In one embodiment, for example, the traffic stream manager 209 may be arranged to establish the wireless communication channel 206 between the wireless devices 202, 204, and communicate multiple traffic streams in a single service period over the wireless communication channel 206. Each traffic stream may have a different level of reliability for delivery of information from the wireless device 202 to the wireless device 204, or vice-versa.

The wireless devices 202, 204 may establish the wireless communication channel 206 using a control point, QAP, or PCP, such as the PCP 220, for example. The PCP 220 may implement various admission control techniques. In various embodiments, the PCP 220 may comprise another peer wireless device or a wireless access point. In one embodiment, for example, the PCP 220 may be implemented as a QAP, PCP or other physical or logical admission control entity for a wireless network. The wireless devices 202, 204 may communicate and negotiate with the PCP 220 via control channels 222a, 222b for admission control and to create a traffic specification for the wireless communication channel 206. This may be accomplished using various communication protocols and associated information elements.

In various embodiments, the MAC controller 208 may generate a packet data structure such as a MPDU or MSDU. In various implementations, the packet data structure may be used in mmWave systems designed to operate in accordance with the WGA Draft Standard and the IEEE 802.11-2007 Standard. It can be appreciated that while exemplary embodiments may be described in the context of WGA Draft Standard and IEEE 802.11-2007 Standards for purposes of illustration, the aspects and advantages described herein may be applicable to improve other wireless communications systems and standards in accordance with the described embodiments. For example, some embodiments may be compatible with devices and/or networks operating in accordance with existing IEEE 802.11, 802.11a, 802.11b, 802.11e, 802.11g, 802.11h, 802.11i, 802.11n, 802.11ad, 802.16, 802.16d, 802.16e, 802.16m, 3GPP Long Term Evolution (LTE) standards, WirelessHD standards, as well as future versions, derivatives, or evolution of the above standards. The embodiments are not limited in this context.

Figure 3:
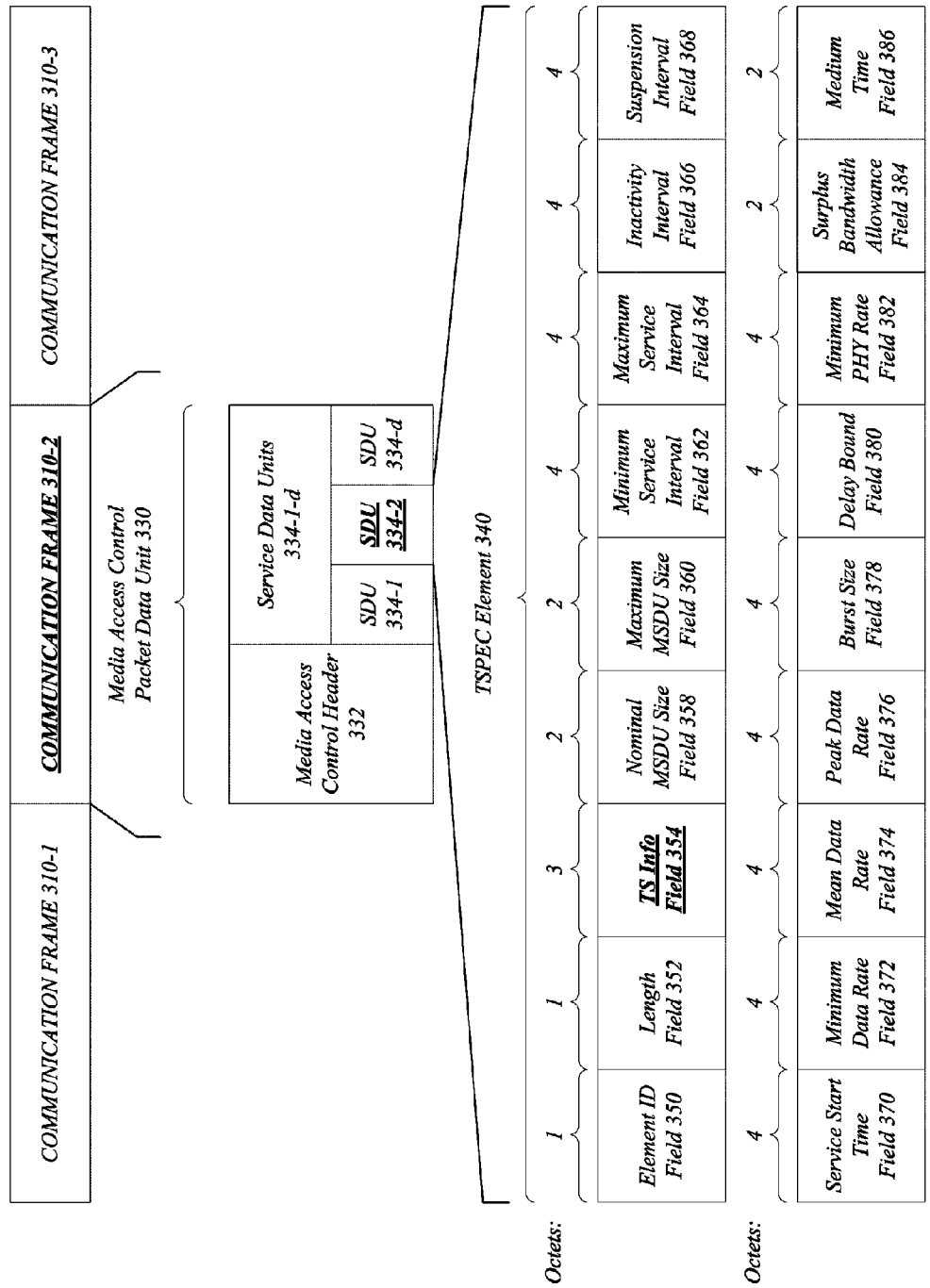
FIG. 3 illustrates one embodiment of a first packet data structure.

FIG. 3 illustrates one embodiment of a packet data structure 300. As shown, the packet data structure 300 may comprise multiple communication frames 310-1-a. The communication frames 310-1-a may comprise, for example, Orthogonal Frequency Division Multiple Access (OFDMA) communication frames used by a WVAN, WPAN or WLAN system. The embodiments, however, are not limited to this example.

Each of the communication frames 310-1-a may be used to communicate one or more MPDUs or MSDUs. A representative communication frame 310-2 includes an example of the MPDU 330. The MAC layer receives higher layer SDUs from a network protocol stack, and classifies them to different transport connections based on different criteria such as QoS support. In addition, the MAC layer may create its own messages such as management messages belonging to different management connections. The MAC layer of a sending node (e.g., the mobile device 202) needs to send these multiple SDUs from various layers of the network protocol stack and the management messages to a receiving node (e.g., the mobile device 204). Consequently, the MAC layer of the sending node has the task of sending MSDUs of different transport and management connections to the MAC layer of the receiving node.

Referring to the illustrated embodiment shown in FIG. 3, the MPDU 330 may include information to identify a given transport or management connection between the wireless devices 202, 204. When established, a connection may comprise a unidirectional or bidirectional logical link between the wireless devices 202, 204. The connections may comprise transport connections for the transmission of user data traffic flows and management connections for the transmission of MAC control and/or signaling data.

In various embodiments, the MPDU 330 may include a media access control header 332 and one or more SDUs 334-1-d. One or more of the SDUs 334-1-d may include various MAC frames and information elements, including a traffic specification (TSPEC) element 340. In one embodiment, the TSPEC element 340 may comprise a TSPEC element as defined by the IEEE 802.11-2007 Standard, as modified by one or more WGA Draft Standards, and as described herein. The TSPEC element 340 describes traffic characteristics and QoS support needed for a traffic stream. The TSPEC element 340 may be used to reserve resources within the PCP 220 and modify scheduling behavior of the PCP 220 and/or the wireless devices 202, 204.

The representative TSPEC element 340 shown in FIG. 3 may comprise multiple fields and values and/or parameters. For instance, TSPEC element 340 may include standard IEEE 802.11-2007 Standard TSPEC fields, including fields 350-386. In some cases, the parameters may be encoded. For instance, some parameters may implemented using a differential encoding technique, and therefore may be derived or dependent on information provided by other communications frames 310-1-a, or information stored by the wireless devices 202, 204.

The traffic stream manager 209 may generate a MAC management action frame having the TSPEC element 340 for communication to the PCP 220. The TSPEC element 340 may include information to establish a service period allocation flow for a first traffic stream to be communicated over the wireless communication channel 206 during the single service period. The TSPEC element 340 may include a time reservation request with a first time parameter for a service period allocated for the first traffic stream.

The traffic stream manager 209 may also generate a MAC management action frame having the TSPEC element 340 for communication to the PCP 220 in order to add other traffic streams to the single service period established for the first traffic stream. In this case, the TSPEC element 340 may be modified to include information to add a second traffic stream to be communicated over the wireless communication channel 206 during the single service period. For example, the TSPEC element 340 may carry an additional time reservation request with a second time parameter to the PCP 220. The PCP 220 may then account for both the first and second time parameters when allocating time for the single service period used by the first and second traffic streams. For instance, the single service period may be extended in time to accommodate the first and second traffic streams.

Although the TSPEC element 340 is useful for admission control and scheduling, the TSPEC element 340 does not provide any reliability parameters for any of the traffic streams. To overcome this deficiency, the traffic stream manager 209 may generate a modified TSPEC element, referred to herein as a PTP TSPEC element. In general use, the TSPEC element 340 may be used to deliver time allocation parameters to the PCP 220, while a PTP TSPEC element may be used to deliver transmission specific parameters between peer mobile devices 202, 204. The transmission specific parameters may be provided to the MAC controller 208a of a transmitting device (e.g., wireless device 202), the MAC controller 208b of a receiving device (e.g., wireless device 204), or to both the MAC controllers 208a, 208b of respective transmitting and receiving devices (e.g., wireless devices 202, 204).

Figure 4:
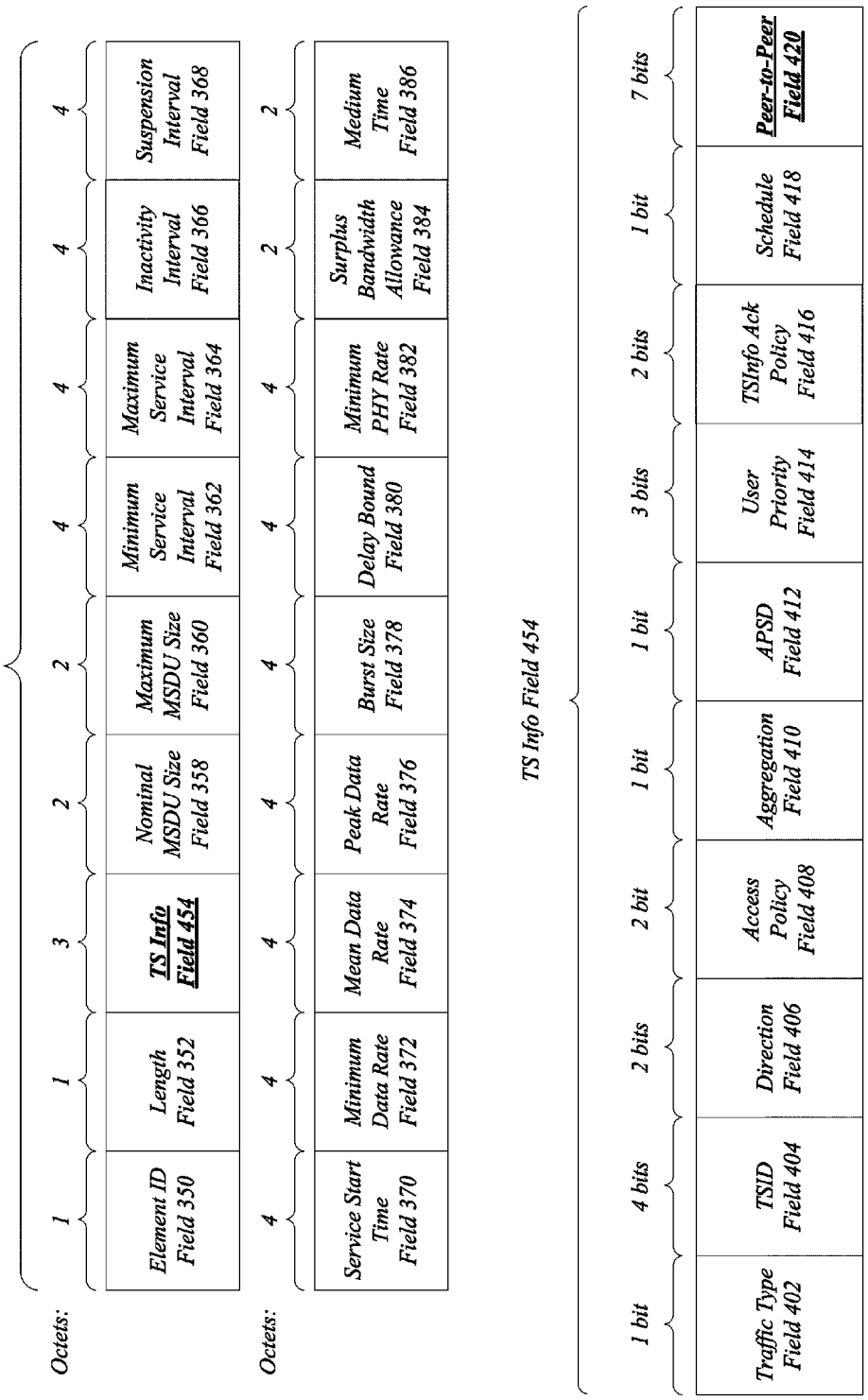
FIG. 4 illustrates one embodiment of a second packet data structure.

FIG. 4 illustrates one embodiment of a PTP TSPEC element 400. In one embodiment, for example, the PTP TSPEC element 400 may comprise a TSPEC element as defined by the IEEE 802.11-2007 Standard and described with reference to the TSPEC element 340 shown in FIG. 3, as modified by one or more WGA Draft Standards, and as described herein. In general, the PTP TSPEC element 400 may be used to communicate communication parameters, such as reliability and QoS characteristics of a data flow, between non-access points QoS stations.

In the illustrated embodiment shown in FIG. 4, the PTP TSPEC element 400 may have multiple fields and parameters similar to those defined for the TSPEC element 340. However, the PTP TSPEC element 400 adds a peer-to-peer (PTP) field 420 to the TS Info field 454. The TS Info field 454 may be implemented as defined by the IEEE 802.11-2007 Standard. As shown in FIG. 4, the TS Info field 454 comprises ten different fields (e.g., fields 402-420), including a reserved field with 7 bits. In one embodiment, for example, the PTP field 420 may be implemented using the 7 reserved bits B17-B23 of the TS Info field 454. The embodiments, however, are not limited to this specific implementation.

In one embodiment, for example, the traffic stream manager 209 may be arranged to generate a MAC management action frame having a PTP TSPEC element 400 for one or both of the wireless devices 202, 204. The PTP TSPEC element 400 may include one or more communication parameters used to communicate traffic streams over the wireless communication channel 206 during the single service period. The communication parameters may include various MAC layer and PHY layer parameters, including without limitation a forward parameter, a reliability parameter, a buffer size parameter, an aggregation parameter, a rate parameter, a rate adaptation parameter, a retransmission parameter, a frame size parameter, a modulation and control scheme parameter, a QoS parameter, an acknowledgement parameter, error detection parameters, error correction parameters, and any other communication parameters related to MAC layer or PHY layer operations. The embodiments are not limited in this context.

Figure 5:
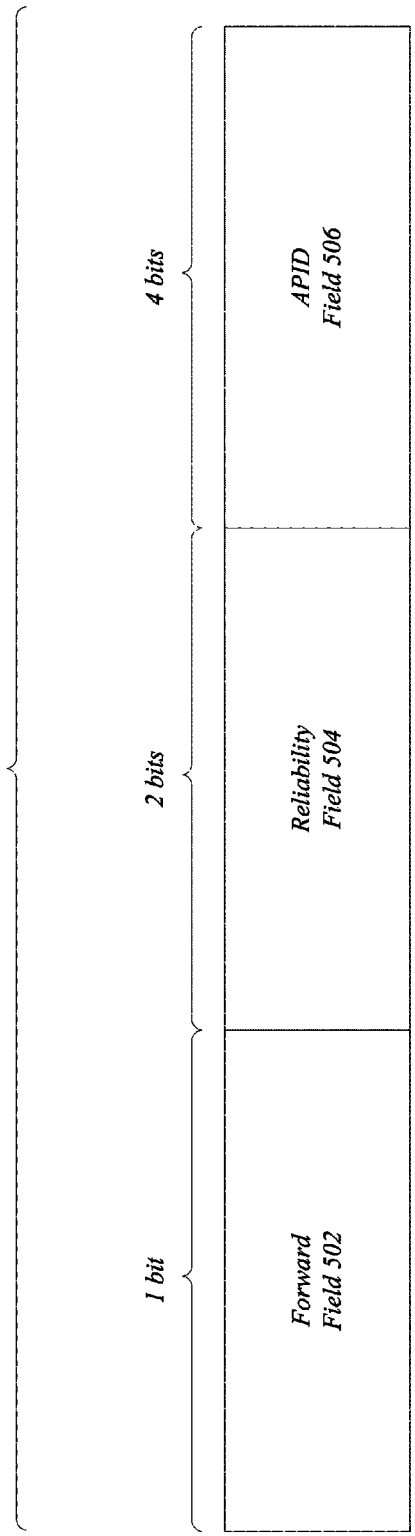
FIG. 5 illustrates one embodiment of a third packet data structure.

FIG. 5 illustrates a more detailed illustration for the PTP field 420. As shown in FIG. 5, the PTP field 500 may comprise three different fields, including a forward field 502 comprising 1 bit, a reliability field 504 comprising 2 bits, and an APID field 506 comprising 4 bits. As can be appreciated, the fields 502, 504, 506 consume 7 bits, which correspond to the 7 reserved bits B17-B23 of the TS Info field 454.

The forward field 502 may be used to communicate a forward parameter to control forwarding operations for the wireless devices 202, 204. In one embodiment, for example, the forward parameter may be set to one ("1") if the PTP TSPEC 400 is transmitted between peer stations, such as the wireless devices 202, 204. If the forward parameter is set to zero ("0"), it is used by the local MAC controller 208a or 208b to establish related transmission parameters.

The reliability field 504 may be used to communicate a reliability parameter to control a reliability level for one or more of the multiple traffic streams. The reliability parameter is provided to qualify more important and less important data. In one embodiment, reliability is measured as a signal-to-noise ratio (SNR) improvement for more reliable data. A MAC layer management entity (MLME) may translate the reliability parameter to the relevant MAC and PHY parameters, such as PHY rate, retry number, forward error correction, and so forth. A wireless device may use the reliability parameter to define a reliability level for each traffic stream.

The reliability field 504 is 2 bits in length and contains a value that is the relative reliability of MSDUs belonging to the traffic stream specified in the PTP TSPEC element 400. If the reliability is not specified, then the value in this field is set to zero ("0").

By way of example, a reliability parameter may be set to a value that specifies a need for SNR improvement (in dB) for the frames identified with a related traffic stream identifier on the MAC service access point (SAP). In one embodiment, for example, if the reliability parameter is set to zero ("0"), then the highest rate (R1) achieved by rate adaptation is used to transmit data frames. If the reliability parameter is not equal to zero ("0"), then the MAC controllers 208a, 208b should transmit data frames using a higher reliability than delivered using R1. A MAC layer management entity (MLME) may decide how to achieve the higher reliability, such as lower rate adaptation, using more forward error correction (FEC), increasing a retry count, and other known reliability techniques.

The APID field 506 may be used to communicate a service period identifier for the multiple traffic streams. The service period identifier may identify a service period that is used to communicate the traffic streams identified by the TSID field 404 of the PTP TSPEC element 400. In some cases, the APID field 506 may replace a TSID field in the scheduling TSPEC element 340. Additionally or alternatively, the APID field 506 may sometimes be referred to as service period TSID (SP TSID).

In the PTP TSPEC element 400, the TSID subfield is 4 bits in length and contains a value that is a TSID. The combination of the TSID, source station AID, destination station AID and direction subfields identify the traffic stream, in the context of the non-access point station, to which the TSPEC applies. A non-access point source station may use the TSID subfield value for an uplink PTP TSPEC and a non-access point destination station may use the same TSID subfield value for a downlink PTP TSPEC at the same time. A bidirectional link request is equivalent to a downlink traffic stream and an uplink traffic stream, each with the same TSID and parameters.

The APID field 506 (or SP TSID field) contains a value that is the TSID of the service period for this PTP TSPEC element 400. Different PTP TSPEC elements that share the same source station and destination station can share a single APID through TSPEC aggregation. When an aggregation field (described below) is set to zero ("0"), the APID field 506 is reserved.

Referring again to the direction subfield comprising 2 bits (B5, B6) of the TS Info field 454, a direction parameter specifies the direction of data carried by the traffic stream as defined in Table 7-38 of the IEEE 802.11-2007 Standard. Direction subfield encoding as defined in Table 7-38 may be modified as shown in Table 1 below:

TABLE 1

| Bit 5 | Bit 6 | Usage |
|---|---|---|
| 0 | 0 | Uplink (MSDUs are sent from the non-AP STA to HC and used in a PTP TSPEC when the ADDTS request frame is sent by the non-AP Source STA). |
| 1 | 0 | Downlink (MSDUs are sent from the HC to the non-AP STA and used in a PTP TSPEC when the ADDTS request frame is sent by the non-AP Destination STA). |

Figure 6:
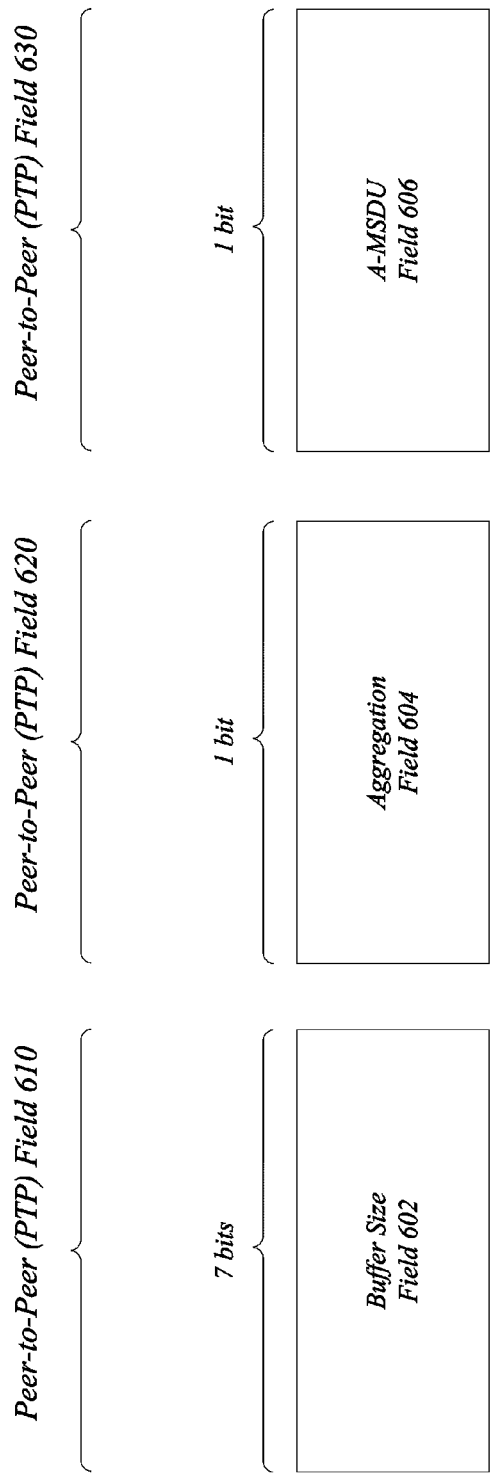
FIG. 6A illustrates one embodiment of a fourth packet data structure.
FIG. 6B illustrates one embodiment of a fifth packet data structure.
FIG. 6C illustrates one embodiment of a sixth packet data structure.

FIGS. 6A-6C represent various additions and/or alternative fields or subfields for the PTP field 420, including a buffer size field, an aggregation field and an A-MSDU field. It may be appreciated that other fields or subfields may be implemented for the PTP field 420 to implement peer-to-peer functionality as desired for a given implementation. The embodiments are not limited in this context.

FIG. 6A illustrates a PTP field 610. In addition to the PTP field 420 described with reference to FIG. 5, or as an alternative, the PTP field 610 shown in FIG. 6A comprises a buffer size field 602. In one embodiment, for example, the traffic stream manager 209 may implement enhanced traffic management techniques that allow one wireless device 202 to communicate memory requirements for information transmitted to another wireless device 204, thereby increasing efficient use of memory resources for the wireless device 204. The buffer size field 602 comprising 7 bits (or less) may be used to communicate a buffer size parameter for the wireless devices 202, 204. More particularly, the buffer size parameter may limit a buffer size used to store information received from one or both of the wireless devices 202, 204. In one embodiment, the buffer size parameter may represent a buffer size for a MSDU, such as a maximum receive buffer MSDU size, for example.

FIG. 6B illustrates a PTP field 620. In addition to the PTP field 420 described with reference to FIG. 5, or as an alternative, the PTP field 620 shown in FIG. 6B comprises an aggregation field 604. In one embodiment, for example, the traffic stream manager 209 may implement enhanced traffic management techniques that allow one wireless device 202 to communicate that an aggregate schedule is needed for information transmitted to another wireless device 204. The aggregation field 604 comprises 1 bit (or more) that may be used to communicate an aggregation parameter for the wireless devices 202, 204. The aggregation field 604 is valid when access method is hybrid coordination function (HCF) controlled channel access (HCCA) or when the source and destination of the flow are members of a mmWave PBS S/BSS or when the access method is enhanced distributed channel access (EDCA) and the schedule subfield is set to one ("1") the aggregation field 604 is set to one ("1") by a non-access point station to indicate that an aggregate schedule is needed. It is set to one ("1") by the access point if an aggregate schedule is being provided to the non-access point station. It is set to one ("1") if the source and destination of the flow are members of a mmWave PBSS/BSS and the non-access point/non-PCP station transmitting the ADDTS request that contains the PTP TSPEC element 400 request and aggregation of a new PTP traffic stream to an existing scheduled service point whose service point TSID value matches the SP TSID of the PTP TSPEC element 400 in the ADDTS request. It is set to one ("1") if the source and the destination of the flow are members of a mmWave PBSS/BSS and the non-access point/non-PCP transmitting the ADDTS response that contains the PTP TSPEC element 400 has accepted an aggregation of a new PTP traffic stream to an existing scheduled service period whose SP TSID value matches the SP TSID of the PTP TSPEC element 400 in the ADDTS response. It is set to zero ("0") otherwise. In all other cases, the aggregation field is reserved.

FIG. 6C illustrates a PTP field 630. In addition to the PTP field 420 described with reference to FIG. 5, or as an alternative, the PTP field 630 shown in FIG. 6C comprises an A-MSDU subframe field 606. In one embodiment, for example, the traffic stream manager 209 may implement enhanced traffic management techniques that allow one wireless device 202 to communicate an A-MSDU subframe structure for information transmitted to another wireless device 204. The A-MSDU subframe field 606 comprises 1 bit (or more) and contains a parameter that is an A-MSDU subframe structure. The A-MSDU subframe field 606 is set to zero ("0") to indicate the networking A-MSDU subframe structure and set to one ("1") to indicate the basic A-MSDU subframe structure.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, firmware, or any combination thereof. The embodiments are not limited in this context.

Figure 7:
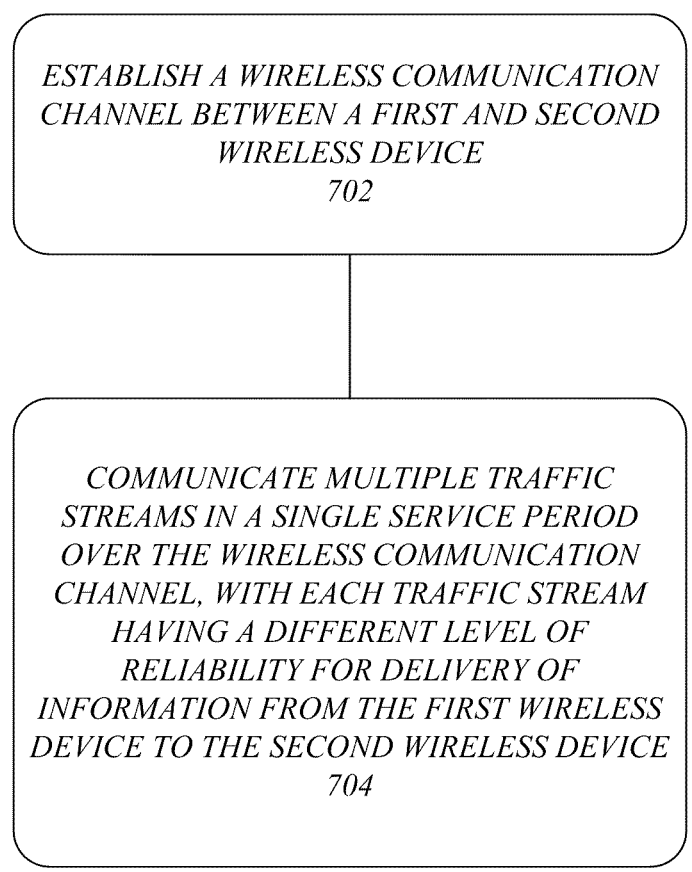
FIG. 7 illustrates one embodiment of a logic flow.

FIG. 7 illustrates one embodiment of a logic flow 700 for selecting a channel pair to form a new wireless network between two or more devices. In various embodiments, the logic flow 700 may be performed by various systems, nodes, and/or modules and may be implemented as hardware, software, and/or any combination thereof, as desired for a given set of design parameters or performance constraints. For example, the logic flow 700 may be implemented by a logic device (e.g., transmitter node, receiver node) and/or logic comprising instructions, data, and/or code to be executed by a logic device. The embodiments are not limited in this context.

In one embodiment, the logic flow 700 may establish a wireless communication channel between a first and second wireless device at block 702. For example, the traffic stream manager 209 may establish the wireless communication channel 206 between the wireless devices 202, 204 via the transceiver 205. In various embodiments, this may be accomplished using WVAN, WPAN or WLAN media connection or transport techniques to setup a connection between the wireless devices 202, 204.

In one embodiment, the logic flow 700 may communicate multiple traffic streams in a single service period over the wireless communication channel, with each traffic stream having a different level of reliability for delivery of information from the first wireless device to the second wireless device at block 704. For example, the traffic stream manager 209 may communicate multiple traffic streams in a single service period over the wireless communication channel 206, with each traffic stream having a different level of reliability for delivery of information from the wireless device 202 to the wireless device 204, or vice-versa. The reliability level may be set in accordance with a reliability parameter communicated using the PTP TSPEC element 400.

Figure 8:
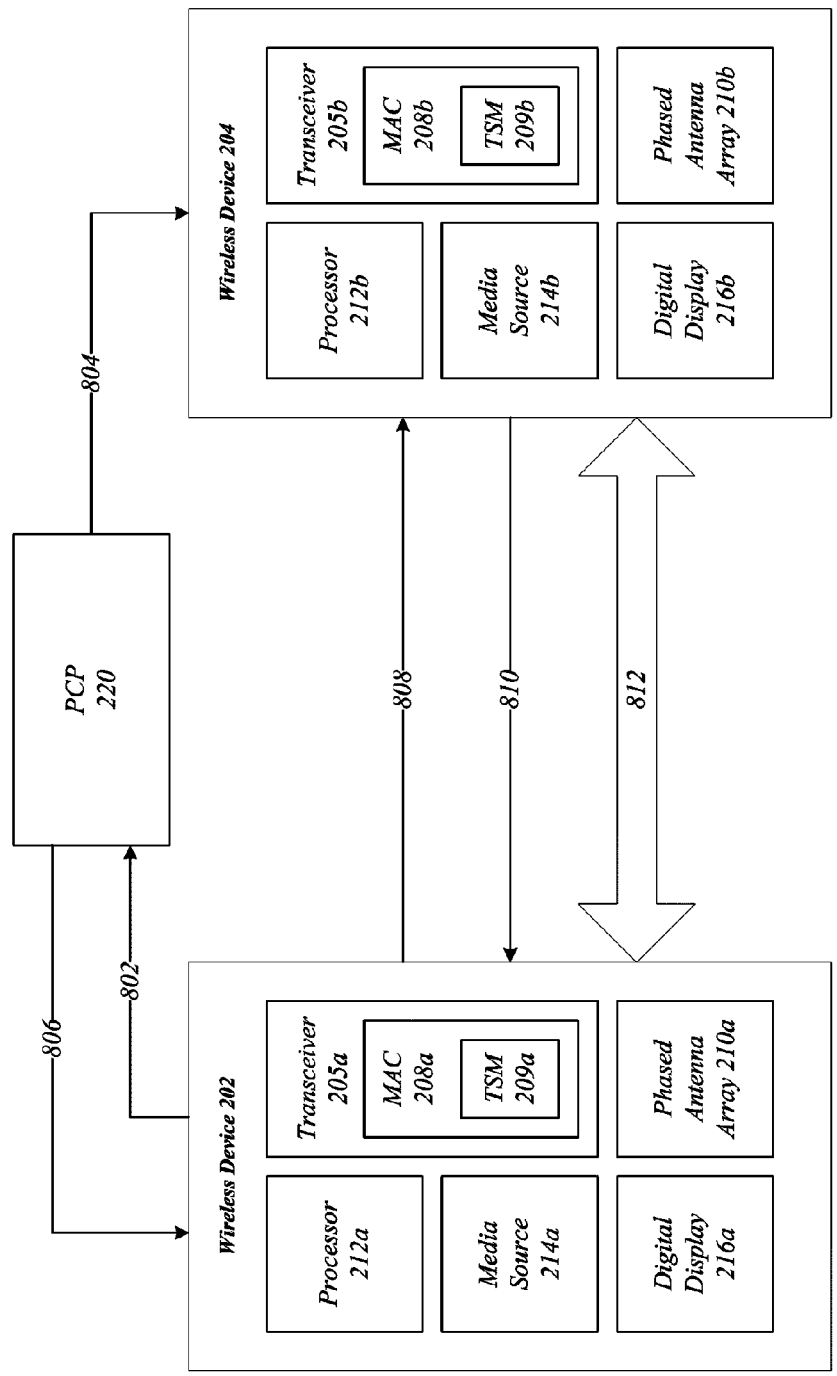
FIG. 8 illustrates one embodiment of a second wireless network.

FIG. 8 illustrates a block diagram of the wireless network 200, with the addition of a message flow illustrating how the wireless communication channel 206 is established and used to communicate multiple traffic streams with different levels of reliability.

Assume that the wireless node 202 is a media source used to establish a unidirectional HT communication channel to the wireless node 204 comprising a digital TV in order to communicate bandwidth demanding and time-sensitive AV streams, such as high definition TV (HDTV) streams.

As shown in FIG. 8, the traffic stream manager 209a may initiate operations by generating and sending an add traffic stream (ADDTS) action request frame to the PCP 220. The ADDTS action request frame may include the TSPEC element 340 with information to establish a service period allocation flow for a first traffic stream to be communicated over the wireless communication channel 206 during the single service period. The TSPEC element 340 may include, among other information, a first time parameter for the single service period. In one embodiment, a station management entity (SME) of the wireless device 202 provides the MAC layer management entity (MLME) primitives, and the traffic stream manager 209a of the MAC controller 208a sends the related frames to the PCP 220. For example, the SME of the wireless device 202 issues MLME-ADDTS.request with the TSPEC element 340 having the following parameters: TSPEC (SA=A, DA=B, APID1, TAllocP1, ... ). The traffic stream manager 209a of the MAC controller 208a sends the ADDTS action request frame with the parameters TSPEC (SA=A, DA=B, APID1, TAllocP1, ... ) as message 802. The term "TAllocP" stands for time allocation parameters.

The traffic stream manager 209a may receive an ADDTS action response frame from the PCP 220. The ADDTS action response frame may have the TSPEC element 340 with a first allocated time parameter (TAllocP) for the single service period allocated by the PCP 220. For example, the PCP 220 may send an ADDTS action response frame to both of the wireless devices 202, 204 via the respective messages 804, 806. The ADDTS action response frame may have the parameters TSPEC (SA=A, DA=B, APID1, TAllocP, . . . ). Both the wireless devices 202, 204 provides an SME MLME-ADDTS.confirm with the parameters TSPEC (SA=A, DA=B, APID1, TAllocP, . . . ).

Once the new service period allocation flow has been established between the wireless devices 202, 204, assume the wireless device 202 needs to add another traffic stream to the service period allocation flow. In this case, the traffic stream manager 209*a* may generate and send an ADDTS action request frame to the PCP 220, with the ADDTS action request frame having the TSPEC element 340 with information to add a second traffic stream to be communicated over the wireless communication channel 206 during the single service period. The TSPEC element 340 may also have a second time parameter for the single service period, which is used to by the PCP 220 to change a time allocation to the existing service period. Similar to the operations for the first traffic stream, the PCP 220 sends an ADDTS action response frame to both of the wireless nodes 202, 204, with the ADDTS action response frame having the TSPEC element 340 with a second allocated time parameter for the single service period. The second allocated time period may comprise a combined value for the first and second time parameters (e.g., TAllocP=TAllocP1+TAllocP2).

Now that the wireless devices 202, 204 are communicating multiple traffic streams within a single service period, the wireless devices 202, 204 may exchange information to transmit the multiple traffic streams within the single service period with different levels of reliability. In one embodiment, for example, this may be accomplished using the PTP TSPEC element 400.

The traffic stream manager 209*a* may generate and send an ADDTS action request frame to the wireless device 204 as message 808. The ADDTS action request frame may have the PTP TSPEC element 400 having one or more communication parameters used to communicate the multiple traffic streams over the wireless communication channel 206 during the single service period. For example, the SME of the wireless device 202 issues MLME-ADDTS.request with PeerTSPEC (SA=A, DA=B, APID1, forward=1, TSID=TSID1, RLB=0, RxBufferMSDUsize=1500). The traffic stream manager 209*a* sends the ADDTS action request frame with PeerTSPEC (SA=A, DA=B, APID1, forward=1, TSID=TSID1, RLB=0, RxBufferMSDUsize=1500) to the wireless device 204 via the MAC controller 208*a* and the transceiver 205*a*.

The wireless device 204 may receive the ADDTS action request frame, and provides to its SME an MLME-ADDTS.indication with PeerTSPEC (SA=A, DA=B, APID1, forward=1, TSID=TSID1, RLB=0, RxBufferMSDUsize=1500). The traffic stream manager 209*b* of the wireless device 204 sends an ADDTS action response frame with PeerTSPEC (SA=A, DA=B, APID1, forward=1, TSID=TSID1, RLB=0, RxBufferMSDUsize=1500) to the wireless device 202 via the MAC controller 208*b* and the transceiver 205*b* as message 810.

The traffic stream manager 209*a* may receive an ADDTS action response frame from the wireless device 204. The ADDTS action response frame may have the PTP TSPEC element 400 having one or more communication parameters used to communicate the multiple traffic streams over the wireless communication channel 206 during the single service period. The traffic stream manager 209*a* provides to its SME MLME-ADDTS.confirm with PeerTSPEC (SA=A, DA=B, APID1, forward=1, TSID=TSID1, RLB=0, RxBufferMSDUsize=1500). The wireless device 202 stores the relationship between TSID and APID in order to determine which SP (APID) to use to transmit a MSDU in relation to its TSID.

If the MLME-ADDBA.request primitive is used to establish a block acknowledgement (BA) agreement, it may already contain one of the assigned TSIDs. The BA recipient shall allocate a reordering buffer with each buffer having a size corresponding to the buffer size parameter (e.g., RxBufferMSDUsize) as agreed in the TSID establishment phase.

Once the wireless devices 202, 204 have exchange communication parameters, they wireless device 202 may begin communicating MPDUs for the various traffic streams during the single service period over the wireless communication channel 206 as indicated by the arrow 812. The MPDUs may be communicated with varying levels of reliability as indicated by the reliability parameters provided by the PTP TSPEC element 400.

Figure 9:
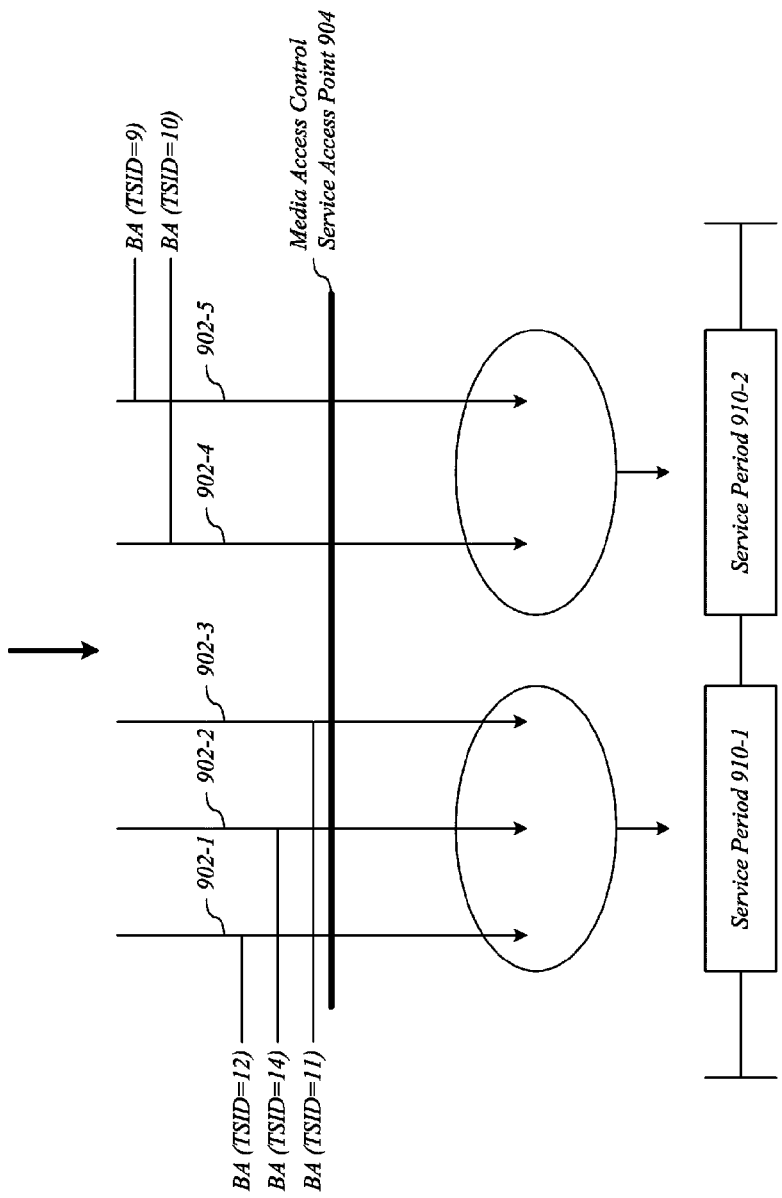
FIG. 9 illustrates one embodiment of a logic diagram.

FIG. 9 illustrates a logic diagram 900 illustrating the traffic stream manager 209*a* communicating different traffic streams with varying levels of reliability. The traffic stream manager 209*s* may be arranged to schedule transmission of information for each traffic stream during the single service period based on a corresponding reliability parameter associated with each traffic stream. As shown in FIG. 9, assume there are two service periods 910-1, 910-2 each having respective APIDs of 11, 9. Further assume that the traffic stream manager 209*a* begins communicating application data (SN) 906 in various traffic streams 902-1 to 902-5.

In the illustrated embodiment shown in FIG. 9, each one of the traffic streams 902-1 to 902-5, having respective TSIDs of 11, 14, 12, 9, 10, may be transmitted across a MAC SAP 904 at a different reliability level as indicated by a corresponding reliability parameter. For instance, the different reliability levels may be implemented by assigning each of the traffic streams 902-1 to 902-5 a different transmission rate, for example. Data inside a given service period 910-1, 910-2 is ordered in relation to the reliability of the stream. For example, a traffic stream of higher reliability will be sent first due to a lower rate or more retransmissions hence it may need more time than reserved by the scheduler. In this case, assume the stream of TSID=12 is of highest reliability in the service period 910-1 (APID=11) and therefore it is transmitted first in the service period 910-1. It may occur that due to a lower transmission rate and more retry transmissions, the MSDUs with TSID=12 will take longer than expected and therefore they will consume part of the time needed for the MSDUs with TSID=14. At the end of the service period 910-1 (APID=11), there may not be sufficient time for transmitting the MSDUs with TSID=11. If the MSDUs of TSID=11 include data that does not require a higher level of reliability, a transmitting rate may be increased, even if part of the frames will be lost. In this manner, a scheduler may reallocate available time in a given service period in order of highest reliability level to lowest reliability level, for example.

In the previous embodiments, the traffic stream managers 209*a*, 209*b* use separate TSPEC elements and/or PTP TSPEC elements to provide information to the PCP 220 and the respective wireless devices 202, 204. It may be appreciated, however, that information for both the PCP 220 and the respective wireless devices 202, 204 may be merged into a single MAC management frame as desired for a given implementation. The embodiments are not limited in this context.

Figure 10:
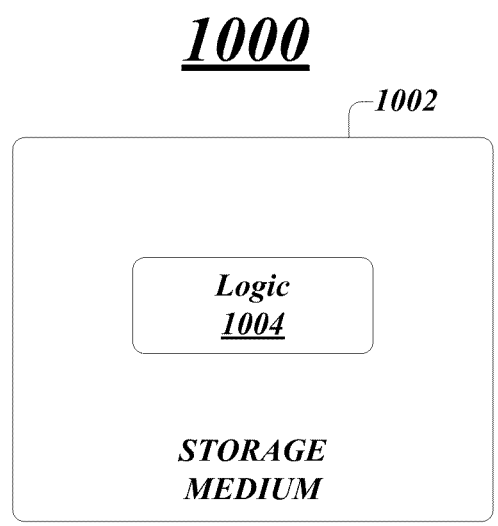
FIG. 10 illustrates one embodiment of an article of manufacture.

FIG. 10 illustrates one embodiment of an article of manufacture 1000. As shown, the article 1000 may comprise a storage medium 1002 to store logic 1004 for implementing enhanced traffic management techniques to offer enhanced traffic management services for a wireless network. For example, logic 1004 may be used to implement the traffic stream managers 209a, 209b, as well as other aspects of the wireless nodes 104-1-n. In various embodiments, the article 1000 may be implemented by various systems, nodes, devices, modules, components and/or parts.

The article 1000 and/or machine-readable storage medium 1002 may include one or more types of computer-readable storage media capable of storing data, including volatile memory or, non-volatile memory, removable or non-removable memory, erasable or non-erasable memory, writeable or re-writeable memory, and so forth. Examples of a machine-readable storage medium may include, without limitation, random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other type of computer-readable storage media suitable for storing information.

The article 1000 and/or machine-readable medium 1002 may store logic 1004 comprising instructions, data, and/or code that, if executed by a machine, may cause the machine to perform a method and/or operations in accordance with the described embodiments. Such a machine may include, for example, any suitable processing platform, computing platform, computing device, processing device, computing system, processing system, computer, processor, or the like, and may be implemented using any suitable combination of hardware and/or software.

The logic 1004 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context. When implemented the logic 1004 is implemented as software, the software may be executed by any suitable processor and memory unit.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It is also worthy to note that any reference to "one embodiment" or "an embodiment" means that a particular feature, structure, or characteristic described in connection with the embodiment is included in at least one embodiment. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A first wireless device, comprising:
a transceiver having a media access control controller to communicate in a wireless network, the media access control controller having a traffic stream manager to:
establish a wireless communication channel between the first wireless device and a second wireless device,
communicate multiple traffic streams in a single service period over the wireless communication channel, with each traffic stream having a different level of reliability for delivery of information from the first wireless device to the second wireless device, and
generate a media access control management action frame having a peer-to-peer traffic stream specification element including a reliability field to communicate a reliability parameter to control a reliability level for one or more of the multiple traffic streams.

2. The first wireless device of claim 1, the traffic stream manager to generate the media access control management action frame having a traffic stream specification element for a private basic service set control point, the traffic stream specification element including information to establish a service period allocation flow for a first traffic stream to be communicated over the wireless communication channel during the single service period.

3. The first wireless device of claim 1, the traffic stream manager to generate the media access control management action frame having a traffic stream specification element for a private basic service set control point, the traffic stream specification element including information to add a second traffic stream to be communicated over the wireless communication channel during the single service period.

4. The first wireless device of claim 1, the traffic stream manager to generate the media access control management action frame having the peer-to-peer traffic stream specification element for the second wireless device, the peer-to-peer traffic stream specification element including one or more communication parameters used to communicate traffic streams over the wireless communication channel during the single service period.

5. The first wireless device of claim 1, the peer-to-peer traffic stream specification element including a forward field to communicate a forward parameter to control forwarding operations for the first or second wireless device.

6. The first wireless device of claim 1, the peer-to-peer traffic stream specification element including a buffer size field to communicate a buffer size parameter for the second wireless device, the buffer size parameter to limit a buffer size used to store information received from the first wireless device.

7. The first wireless device of claim 1, the peer-to-peer traffic stream specification element including a service period field to communicate a service period identifier for the multiple traffic streams.

8. The first wireless device of claim 1, the traffic stream manager to schedule transmission of information for each traffic stream during the single service period based on a corresponding reliability parameter associated with each traffic stream.

9. The first wireless device of claim 1, the transceiver to communicate in a Millimeter-Wave (mmWave) directional wireless network.

10. The first wireless device of claim 1, comprising a phased antenna array communicatively coupled to the transceiver.

11. The first wireless device of claim 1, comprising a digital display.

12. A method comprising:
establishing a wireless communication channel between a first and second wireless device;
communicating multiple traffic streams in a single service period over the wireless communication channel, with each traffic stream having a different level of reliability for delivery of information from the first wireless device to the second wireless device; and
generating a media access control management action frame having a peer-to-peer traffic stream specification element including a reliability field to communicate a reliability parameter to control a reliability level for one or more of the multiple traffic streams.

13. The method of claim 12, comprising sending an add traffic stream action request frame to a private basic service set control point, the add traffic stream action request frame having a traffic stream specification element with information to establish a service period allocation flow for a first traffic stream to be communicated over the wireless communication channel during the single service period, and a first time parameter for the single service period.

14. The method of claim 12, comprising receiving an add traffic stream action response frame from a private basic service set control point, the add traffic stream action response frame having a traffic stream specification element with a first allocated time parameter for the single service period.

15. The method of claim 12, comprising sending an add traffic stream action request frame to a private basic service set control point, the add traffic stream action request frame having a traffic stream specification element with information to add a second traffic stream to be communicated over the wireless communication channel during the single service period, and a second time parameter for the single service period.

16. The method of claim 12, comprising receiving an add traffic stream action response frame from a private basic service set control point, the add traffic stream action response frame having a traffic stream specification element with a second allocated time parameter for the single service period.

17. The method of claim 12, comprising sending an add traffic stream action request frame to the second wireless device, the add traffic stream action request frame having the peer-to-peer traffic stream specification element having one or more communication parameters used to communicate traffic streams over the wireless communication channel during the single service period.

18. The method of claim 12, comprising receiving an add traffic stream action response frame from the second wireless device, the add traffic stream action response frame having the peer-to-peer traffic stream specification element having one or more communication parameters used to communicate traffic streams over the wireless communication channel during the single service period.

19. The method of claim 12, comprising scheduling transmission of information for each traffic stream during the single service period based on a corresponding reliability parameter associated with each traffic stream.

20. An article comprising a computer-readable storage medium containing instructions that when executed enable a system to:
establish a wireless communication channel between a first and second wireless device;
communicate multiple traffic streams in a single service period over the wireless communication channel, with each traffic stream having a different level of reliability for delivery of information from the first wireless device to the second wireless device; and
generate a media access control management action frame having a peer-to-peer traffic stream specification element including a reliability field to communicate a reliability parameter to control a reliability level for one or more of the multiple traffic streams.

21. The article of claim 20, further comprising instructions that when executed enable a system to generate the media access control management action frame having a traffic stream specification element for a private basic service set control point, the traffic stream specification element including information to establish a service period allocation flow for a first traffic stream to be communicated over the wireless communication channel during the single service period.

22. The article of claim 20, further comprising instructions that when executed enable a system to generate the media access control management action frame having a traffic stream specification element for a private basic service set control point, the traffic stream specification element including information to add a second traffic stream to be communicated over the wireless communication channel during the single service period.

23. The article of claim 20, further comprising instructions that when executed enable a system to generate the media access control management action frame having the peer-to-peer traffic stream specification element for the second wireless device, the peer-to-peer traffic stream specification element including one or more communication parameters used to communicate traffic streams over the wireless communication channel during the single service period.

24. The article of claim 20, the peer-to-peer traffic stream specification element including a forward field to communicate a forward parameter to control forwarding operations for the first or second wireless device.

25. The article of claim 20, the peer-to-peer traffic stream specification element including a buffer size field to communicate a buffer size parameter for the second wireless device, the buffer size parameter to limit a buffer size used to store information received from the first wireless device.

26. The article of claim 20, the peer-to-peer traffic stream specification element including a service period field to communicate a service period identifier for the multiple traffic streams.

27. The article of claim 20, further comprising instructions that when executed enable a system to schedule transmission of information for each traffic stream during the single service period based on a corresponding reliability parameter associated with each traffic stream.

28. The article of claim 20, further comprising instructions that when executed enable a system to set a buffer size based on a buffer size parameter received from the second wireless device.

* * * * *

UNITED STATES PATENT AND TRADEMARK OFFICE
CERTIFICATE OF CORRECTION

| | | |
|---|---|---|
| PATENT NO. | : 8,743,711 B2 | Page 1 of 1 |
| APPLICATION NO. | : 12/638056 | |
| DATED | : June 3, 2014 | |
| INVENTOR(S) | : Solomon Trainin | |

It is certified that error appears in the above-identified patent and that said Letters Patent is hereby corrected as shown below:

On the Title page, in item (56), in column 2, under "Other Publications", line 5, delete "networs" and insert -- networks --, therefor.

In the Drawings

On sheet 4 of 10, FIG. 4, line 11, delete "2 bit" and insert -- 2 bits --, therefor.

Signed and Sealed this
Second Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,743,711 B2  
APPLICATION NO. : 12/638056  
DATED : June 3, 2014  
INVENTOR(S) : Solomon Trainin Page 1 of 1

It is certified that error appears in the above-identified patent and that said Letters Patent is hereby corrected as shown below:

On the Title page, in item (56), in column 2, under "Other Publications", line 5, delete "networs" and insert -- networks --, therefor.

On the Title page, in the illustrative figure, line 11, "2 bit" should read -- 2 bits --.

In the Drawings

On sheet 4 of 10, FIG. 4, line 11, delete "2 bit" and insert -- 2 bits --, therefor.

This certificate supersedes the Certificate of Correction issued September 2, 2014.

Signed and Sealed this  
Thirtieth Day of September, 2014

Michelle K. Lee  
*Deputy Director of the United States Patent and Trademark Office*